J. J. VAN IDERSTINE.
VEHICLE WHEEL.
APPLICATION FILED JAN. 2, 1912.
1,067,386.
Patented July 15, 1913.
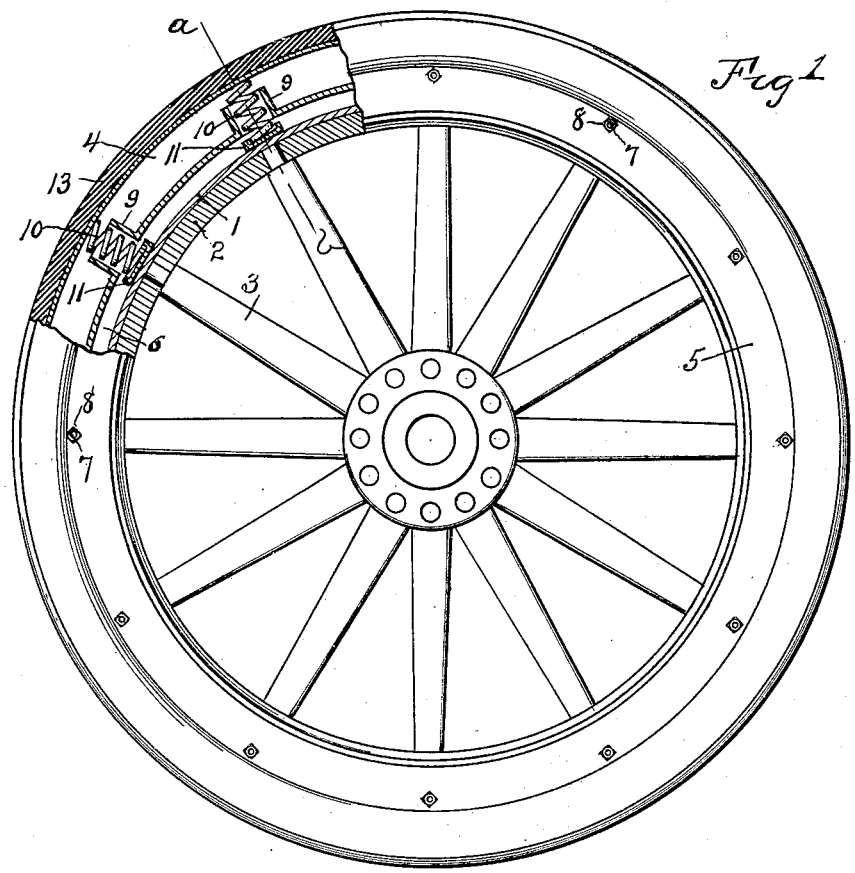
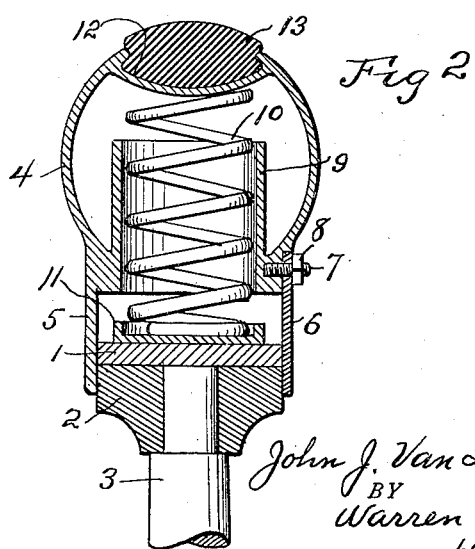
WITNESSES:
R. Hamilton.
E. B. House.
INVENTOR.
John J. Van Iderstine
BY
Warren D. House
His ATTORNEY.

UNITED STATES PATENT OFFICE.

JOHN J. VAN IDERSTINE, OF KANSAS CITY, MISSOURI.

VEHICLE-WHEEL.

1,067,386.   Specification of Letters Patent.   Patented July 15, 1913.

Application filed January 2, 1912. Serial No. 668,848.

*To all whom it may concern:*

Be it known that I, JOHN J. VAN IDERSTINE, a citizen of the United States, residing at Kansas City, in the county of Jackson and State of Missouri, have invented certain new and useful Improvements in Vehicle-Wheels, of which the following is a specification.

My invention relates to improvements in vehicle wheels.

The object of my invention is to provide a device which may be readily and securely affixed to an ordinary wagon or carriage wheel, and which will have the resiliency and other advantages of an inflatable pneumatic tire, but which can not be punctured.

The novel features of my invention are hereinafter fully described and claimed.

In the accompanying drawing which illustrates the preferred form of my invention, Figure 1 is a view partly in side elevation and partly in vertical section of a wheel having mounted on it my improved attachment. Fig. 2 is an enlarged cross section view on the line $a$—$b$ of Fig. 1.

Similar reference characters designate similar parts in the different views.

1 designates the tire, 2 the felly and 3 the spokes of an ordinary carriage or wagon wheel.

Encircling the tire 1 and detachable therefrom is a rim which comprises preferably an annular tubular body 4 which encircles but is spaced apart from the tire 1, the body having an annular inwardly extending flange 5 disposed at one edge of the tire 1, and a ring 6 secured to the body 4 by any suitable means, such as bolts mounted in the body 4 and extending through the ring 6 and designated by 7, the bolts having mounted thereon nuts 8 which bear against the outside of the ring 6. The ring 6 is disposed parallel with the flange 5 at the other edge of the tire 1.

The rim is provided with radial tubular guides 9 which extend outwardly from the channel formed by the body, the flange 5 and ring 6. Respectively mounted in and extending through the tubular guides 9 are coil springs 10 the outer ends of which bear against the inner wall of the body 4, and the inner ends of which extend into the channel and bear against and are slidable upon the periphery of the tire 1. By having the radial springs 10 slidable on the tire 1, the springs, when in the horizontal position can move vertically over the tire 1 so as to permit the movement vertically of the wheel within the rim. As shown the inner ends of the springs 10 may be mounted in suitable containers comprising cups 11 which are slidable on the tire 1.

The periphery of the body 4 may be provided with an annular groove 12 in which may be mounted a yielding rubber tread or tire 13. The groove 12 may be of the clencher type, the side walls of the groove being inwardly turned to more securely hold the tread or tire 13.

As the springs which are in position to support the weight of the wheel are compressed thereby, the springs which at the time are horizontally disposed will be free to permit the relative vertical movement between the wheel and attachment, inasmuch as the springs are not fixed at their inner ends to the tire 1. If it is desired for any reason to detach the rim from the wheel, the nuts 8 are removed from the bolts 7, after which the ring 6 may be detached from the body 4, thus permitting the body to be detached from the wheel.

I do not limit my invention to the structure shown and described, as modifications, within the scope of the appended claim, may be made without departing from the spirit of my invention.

Having thus described my invention, what I claim and desire to secure by Letters Patent, is:—

In a vehicle wheel, a tire, a rim encircling the tire and having an annular tubular body, radial tubular guides extending outwardly from the inner side of the body and means for slidingly engaging opposite edges of the tire, and coil springs extending respectively through said tubular guides and having their outer ends bearing against the inner wall of said body, and their inner ends bearing against and slidable upon the tire.

In testimony whereof I have signed my name to this specification in presence of two subscribing witnesses.

JOHN J. VAN IDERSTINE.

Witnesses:
WARREN D. HOUSE,
LILLIAN J. VAN IDERSTINE.

Copies of this patent may be obtained for five cents each, by addressing the "Commissioner of Patents, Washington, D. C."